United States Patent [19]
Ellis

[11] 4,042,957
[45] Aug. 16, 1977

[54] DISPLAY SYSTEMS

[75] Inventor: Stafford Malcolm Ellis, Maidstone, England

[73] Assignee: Elliott Brothers (London) Limited, Chelmsford, England

[21] Appl. No.: 633,501

[22] Filed: Nov. 19, 1975

[30] Foreign Application Priority Data
Nov. 29, 1974 United Kingdom ............... 51842/74

[51] Int. Cl.² .......................... H04N 5/74; G02B 5/04
[52] U.S. Cl. ..................................... 358/109; 358/87; 358/103; 358/250; 358/237; 350/173
[58] Field of Search ............... 178/7.85, DIG. 20, 6.8, 178/6; 350/173; 358/87, 104, 103, 109, 250, 237

[56] References Cited
U.S. PATENT DOCUMENTS
3,936,148  2/1976  Ellis ............................. 178/DIG. 20

Primary Examiner—Robert L. Griffin
Assistant Examiner—Edward L. Coles
Attorney, Agent, or Firm—Kirschstein, Kirschstein, Ottinger & Frank

[57] ABSTRACT

This invention relates to a head-up display unit having at least a part so disposed, when in use in a vehicle, as to intercept the line of sight of an observer using the unit to view a scene lying ahead of him. The display unit employs a light deflecting arrangement to enable the observer to see the part of the scene obscured by the unit and includes optical means for projecting light rays from a luminous signal source into the light deflecting arrangement thence to the observer, who sees the luminous signals superimposed on his view of the scene ahead.

7 Claims, 6 Drawing Figures

DISPLAY SYSTEMS

This invention relates to head-up display systems and in particular to a display unit for such a system.

A head-up display system enables a person positioned within a vehicle or other enclosure to observe a scene outside while at the same time enables that person to see in superposition on that scene information presented for his observation and use in the form of luminous signals e.g. characters, lines, etc, originating from a source such as, for example, the screen of a cathode ray tube.

The apparatus which presents the luminous signals in the above-stated manner is the head-up display unit.

Conventional head-up display units contain optical systems which collinate the luminous signals and project them through an output aperture. The optical distance from the observer to this output aperture determines, for a given size of aperture, the area of the luminous signal source that is visible to the observer at a given position. The shorter this optical path the greater is the area of the source visible to the observer without moving his head, this area being referred to as the instantaneous field of view of the observer.

One type of conventional head-up display system includes a semi-reflective, transparent combiner screen inclined to the normal line of signt of the observer such that the external scene is visible through the screen, while the collimated luminous signals are reflected from this screen to the observer so as to appear to originate from a source at an infinite distance in front of him. To avoid obscuring the observer's external view the optical apparatus is positioned below or above his line of sight, but thereby increasing the optical path from the output aperture to the observer. The area of screen instantaneously visible to the observer may be increased by increasing the size of the output aperture, but in a space as confined as say, an aircraft cockpit the resultant bulky optical apparatus takes up valuable space.

In a more recent type of head-up display unit at least the output aperture part of the optical system is disposed between the observer and the scene ahead of him to give a shorter optical path than in a comparable aforementioned conventional system, and a periscope-like light deflecting apparatus is provided to enable the observer to see the scene ahead of him as if said part of the optical system were absent.

However, with such a system (in its existing form), although the observer's instantaneous field of view of the luminous signal source may be made greater than in a conventional system considerations such as the need for an obstruction-free ejection path in an aircraft cockpit will require the optical path from the output aperture to the observer to be so large that the observer has to move his head to observe the total area of the luminous signal source.

It is an object of the present invention to provide a head-up display unit in which this difficulty is alleviated.

Accordingly the present invention provides a head-up display unit having: at least a part so disposed, when in use in a vehicle, as to intercept the line of sight of an observer using the unit to view a scene lying ahead of him; a light deflecting arrangement which enables the observer to see said scene substantially as if said part of the display unit were absent; a source of luminous signals; and means for projecting light rays from the source of luminous signals into the light deflecting arrangement so as to be coincident with, and thence to follow substantially the same optical path as rays originating from said scene, so to present to the observer, using the unit, a collimated display of said luminous signal source within his angular field of view of the said scene.

In a preferred arrangement said means for projecting light rays from the source of luminuous signals includes one or more partially light reflective surfaces disposed in the paths of, and partially transmissive to light rays from the said scene to said deflecting means and operative to reflect collimated light rays from the source of luminous signals toward said deflecting means.

Preferably said light deflecting arrangement comprises first and second light reflective planar films disposed in the line of sight of the observer to the aforesaid at least part of the unit and so inclined to one another as to define a space in the form of a prism of triangular cross-section, the apical edge of which is remote from said at least part of the unit, and third and fourth light reflective planar films parallel to and spaced with respect to the said first and second planar films respectively; and in which, the angle of inclination between the first and second planar films is such, and the dimensions of the four planar films and spacings between the first and third and second and fourth flms, respectively, are such that certain rays from the distant scene and incident on the third or the fourth planar film are received at at least one eye of the observer after an even number of successive reflections at the first and third or the second and fourth planar films respectively; and wherein said one or more partially light reflective surfaces are disposed in the paths of, and are partially transmissive to light rays from the distant scene to one or other of said third and fourth light reflective planar films and are operative to reflected collimated light rays from the source of luminous signals on to one or other of said third and fourth light reflective planar films.

One head-up display unit in accordance with the invention suitable for use in an aircraft will now be described by way of example with reference to the accompanying drawings in which.

Figure 1:
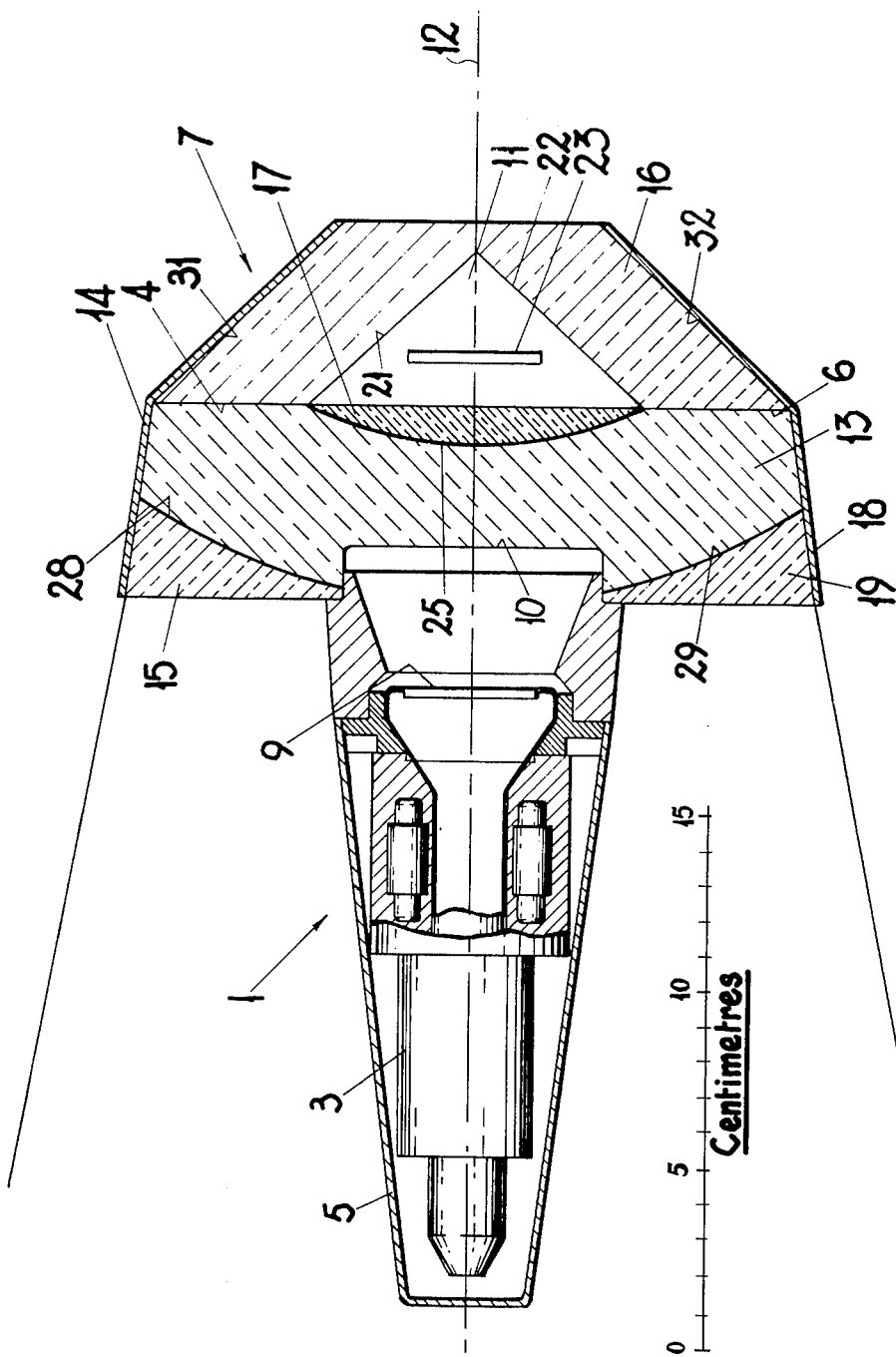
FIG. 1 shows a transverse section through the display unit.

Referring to FIG. 1, the head-up display unit 1 includes a cathode ray tube 3 within an housing 5, and a light deflecting arrangement 7.

Figure 2:
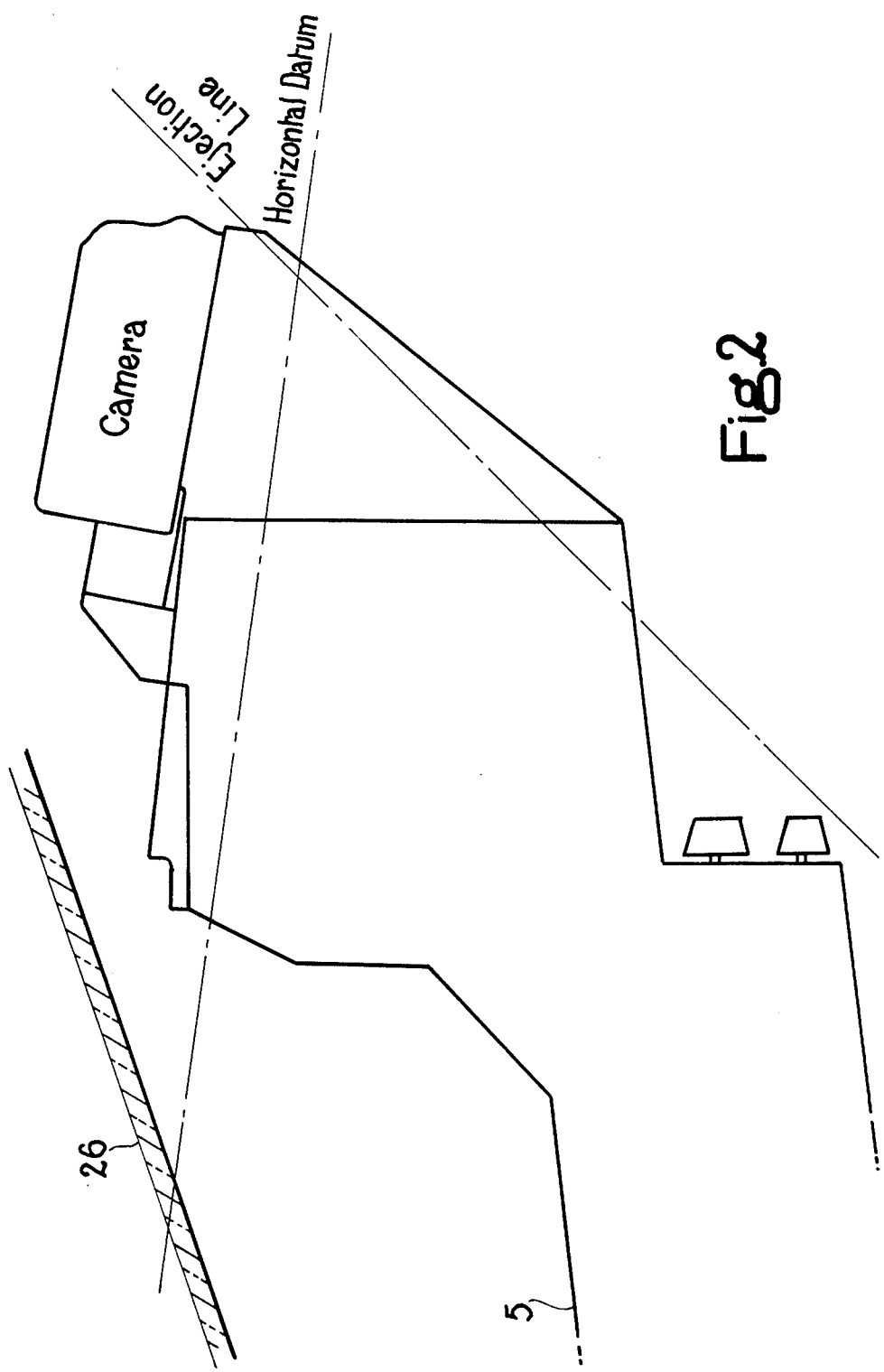
FIG. 2 shows, in side elevation, and to the same scale, the display unit of FIG. 1.

The unit 1 when carried in an aircraft is supported with respect to the aircraft frame, as shown in FIG. 2, so that the tube 3 and housing 5 intercept the line of sight of an observer (not shown) to the distant scene forward of the unit through the windshield or canopy 26.

The display unit has a longitudinal optical axis 12 which extends towards the pilot's eye when the pilot's head is in the observation position.

The components of the display unit are aligned along the axis 12. At the forward end (i.e. relative to the aircraft) of the unit is disposed the cathode-ray tube 3, its rearwardly facing screen 9 acting as a luminous signal source. To the rear of this rearwardly facing screen 9 is an output aperture 10 through which the light rays originating from the screen 9 emerge.

Disposed between the output aperture 10 and the observer is the light deflecting arrangement 7, and between the arrangement 7 and the aperture 10 are means for projecting the light rays emanating from the aperture 10 into the deflecting arrangement 7. These means comprise a Cassegrain-type optical system having a convex aspherical secondary reflective surface 25 symmetrically disposed about the axis 12 and situated to the rear of, and removed from, the aperture 10, and a concave aspherical primary reflective surface having portions 28 and 29 situated one on each side of the aperture 10, as further described below.

The light deflecting arrangement 7 comprises four light reflective planar films 21, 22, 31 and 32 which are supported by and mounted on a glass structure 16. The two inner films 21 and 22 are so inclined to one another as to define a space 11 in the form of a prism of triangular cross-section, the apical edge of which is remote from the output aperture 10. The two outer films 31 and 32 are parallel to, and spaced with respect to, the inner films 21 and 22 respectively. The glass structure 16 supporting the films is shaped such that a plane face 8 normal to the axis 12 is presented to the observer, and two forward facing, separated co-planar faces 4 and 6 are formed parallel to the face 8.

Figure 3:
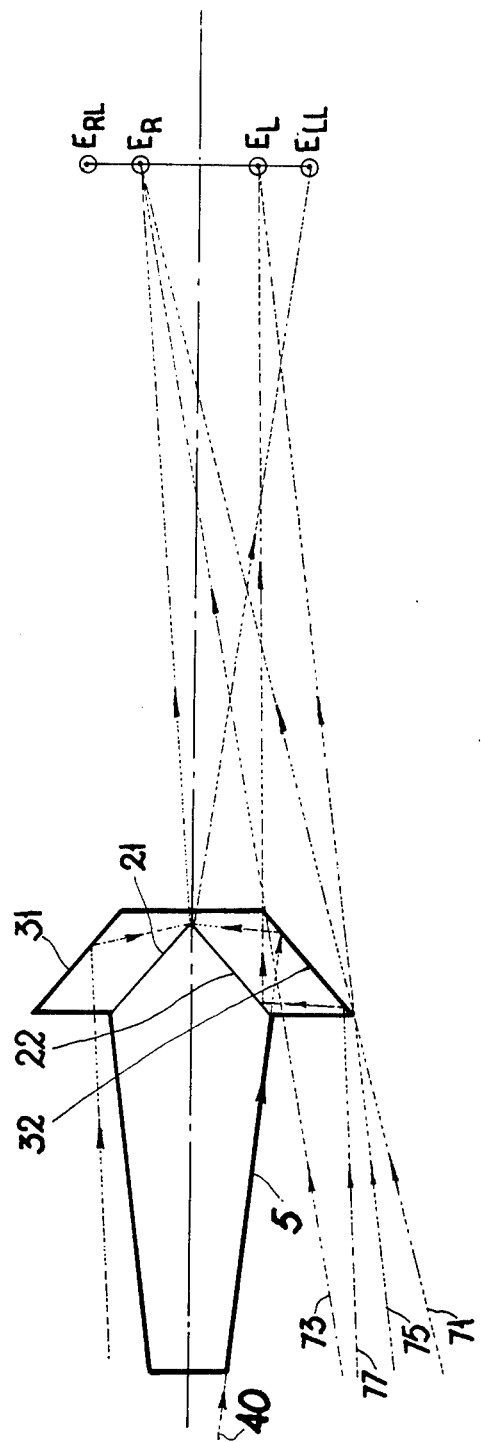
FIG. 3 shows the paths of certain light rays of external origin through the display unit of FIG. 1

The design and operation of the light deflecting arrangement 7 will now be explained with reference to FIG. 3. The two portions of the primary Cassegrain reflective surface 28 and 29 of FIG. 1 are partially light transmissive and do not affect the operation of light deflecting arrangement 7; they are thus omitted from FIG. 3. The normal, operational position of the observer's eyes are represented by the dots $E_R$ and $E_L$, the subscripts R and L denoting respectively the right and left hand sides of the observer. A reasonable range of normal transverse head movement on the part of the observer must be allowed for and the arrangement 7 must be so constructed as to prevent the observer's view being interrupted by the casing 5 even when his head is displaced sideways within this range. The said transverse range is defined by the limiting positions of the right and left eyes indicated at $E_{RL}$ and $E_{LL}$. If the observer moves his head further than these limits he would observe the casing 5, as may be seen from the light ray 40 which grazes the edge of the casing.

In looking at the distant scene from the normal (central) observation eye positions $E_R$ and $E_L$ the observer will see reflected from the inner films 21 and 22, by virtue of reflection from the outer films 31 and 32, the scenes in those hidden fields of view which lie directly behind, and are observed by, the screen 10 and casing 5 of the cathode ray tube. In addition, the eyes may also perceive, at the same position, light coming from around the sides of the deflecting arrangement 7 and light coming through the deflecting arrangement 7 without reflection. Objects in the distance seen by virtue of light having such paths appear in proper spatial relation with respect to objects which are seen by virtue of reflection at the parallel reflecting films; and the observer is not subject to any discontinuities in his field of vision as a result of the differing optical paths taken by the light reaching his eyes.

Figure 4:
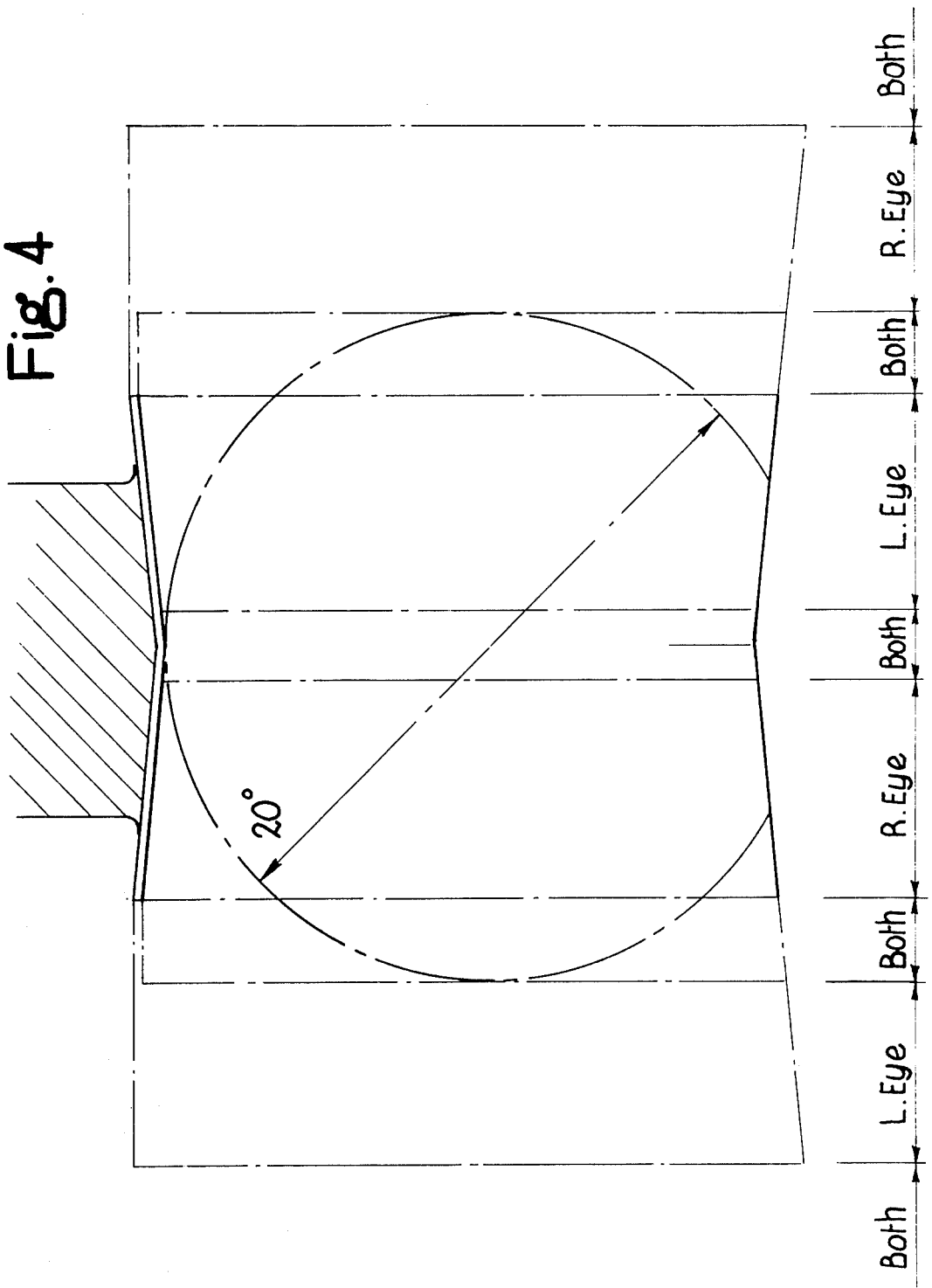
FIG. 4 depicts full-size the field of view available at the observation position for the observer using the unit of FIG. 1.
Figure 5:
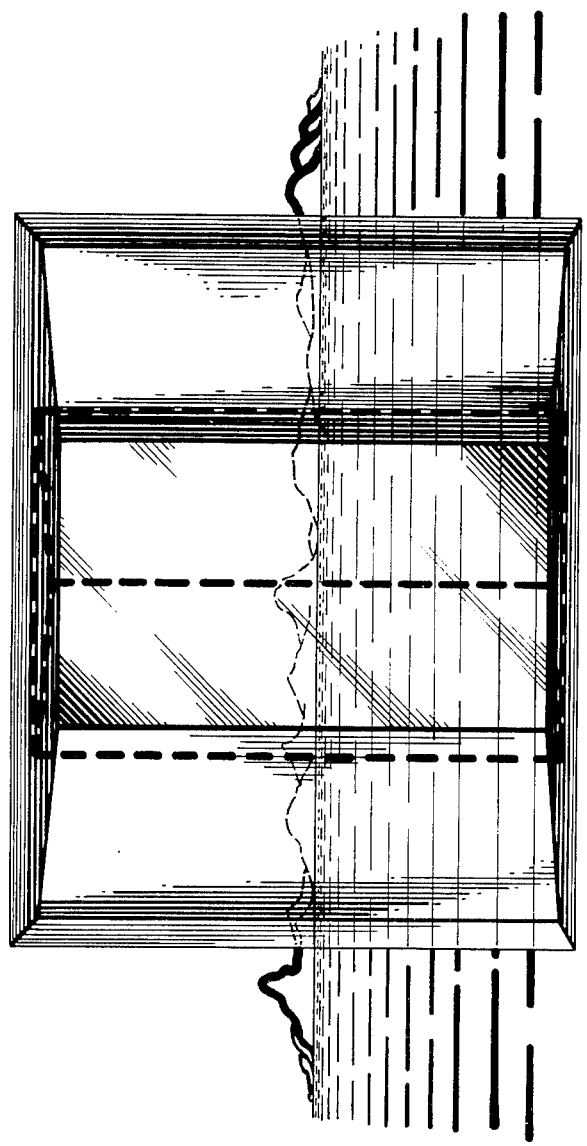
FIG. 5 shows in end elevation the display unit of FIG. 1.

The continuity in the observers field of vision is further explained with reference to FIGS. 3 and 4. In FIG. 3 light ray 71 limits the region that the observer can see with both eyes around the left edge of the unit, because rays to the right eye from a direction slightly to the right of ray 71 are obscured by the nonreflecting reverse face of the film 32. Then, as the eyes progressively scan from left to right the ray 73 reaches the right eye by direct transmission through the glass and both eyes view the scene until the limiting ray 75 is received by the left eye. Light from the directions bounded by rays 75 and 77 is received by the right eye only by means of successive reflections from the films 22 and 32 or from films 21 and 31, the left eye coming back into use when the eyes look in the direction or ray 77 which reaches the left eye by way of reflection from the films 22 and 32. As the eyes scan towards the right an analogous process occurs, thus giving the symmetrical picture of FIG. 4 where, as is shown, there are four regions in the forward field of view of the observer in which the distant scene is viewed with one eye only. The observer's view, however, remains unaffected by the way in which light reaches his eyes, and a typical observer's view of a distant scene is shown in FIG. 5.

Figure 6:
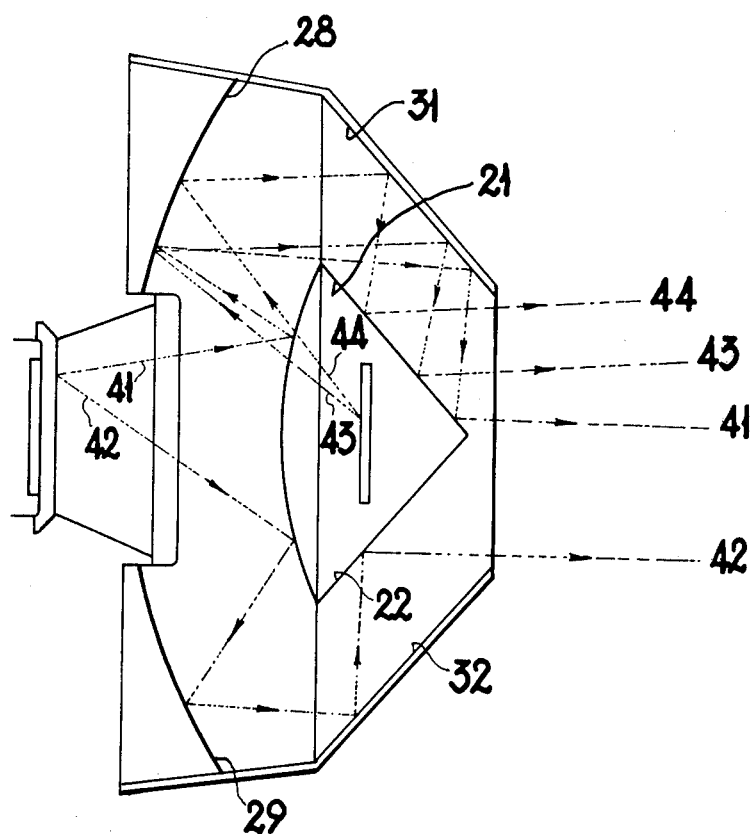
FIG. 6 shows the paths of certain light rays which originate from within the display unit of FIG. 1.

With reference to FIGS. 1 and 6, the means for projecting collimated luminous signals into incidence with the light deflecting arrangement 7 will now be more fully described. As previously stated these means comprise primary and secondary reflecting surfaces forming a Cassegrain-type system. A light-transmissive element 13 is positioned to the rear of the output aperture 10 and projects to the left and right sides of the aperture. One reflecting film portion 28 of the primary Cassegrain reflector is formed at the curved interface of the mating surfaces of light transmissive element 15 and one projecting portion of element 13. The other portion 29 of the primary reflector is formed likewise at the mating surfaces of element 19 and the other projecting portion of element 13. The element 13 is cemented, using an optical cement of matching refractive index, to the plane faces 4 and 6 of the light deflecting arrangement, and the surfaces 14 and 18 formed from elements 13, 15 and 19 are coated with an opaque coating. The secondary reflecting surface 25 of the Cassegrain system is formed at the curved interface of the rearward facing surface of element 13 and mating element 17.

The relative positions of the primary and secondary reflectors are the same as in a normal Cassegrain system, where parallel light incident on the primary reflector is brought to a focus on a screen, but in the present case the process is reversed and the screen 9 is the source of light and parallel emergent rays are the desired result; the same optical conditions, however obtain for both cases.

In FIG. 6 a pair of light rays (41, 42) are shown which are emitted from a single point on the screen 9 of the cathode ray tube. The rays are collimated by the Cassegrain system by being reflected from the secondary reflector 25 to one of the portions 28 or 29 of the primary reflector, and then are reflected into incidence with one of the outer, planar, reflecting films 31 or 32. From an outer reflecting film, these rays are then reflected to an inner reflecting film 21 or 22 and thence to the eye of an observer who observes these rays as if they come from infinity and sees the whole display present on the screen 9 superimposed on the distant scene viewed through the light deflecting arrangement 7. FIG. 4 shows the image of the circular screen 9 as it appears to the observer and which image typically subtends at the observer's eye a cone angle of 20°.

Referring again to FIG. 1, in the space 11 between the secondary reflector 25 and the two inner films 21 and 22 of the light deflecting arrangement, there is a secondary source of luminous data signals 23. This source comprises a two-dimensional array of light emissive diodes which emit light rays in a forward direction. Associated with the source 23 there is a collimating optical system certain elements (not shown) of which may be located with in the space 11 also. Light from the diodes is thus collimated and reflected from one of the portions 28 or 29 of the primary reflector and brought into incidence with the planar reflecting films. Thus a further display viewed at infinity and superimposed on the distant scene is available to the observer. To enable this secondary source to function the secondary Cassegrain reflector 25 is made partially light transmissive. The paths of two typical rays of light (43, 44) from a single point on the source 23 are shown in FIG. 6.

An alternative arrangement of the secondary signal display system is for the secondary reflector 25 to be made non-transmissive to light; and the first and second planar reflective films 21 and 22 made partially light transmissive at least within the region of presentation of any reverse directed display presented by the source 23. In such a direct view arrangement it is necessary to insert collimating means between the source 23 and the observer in order that the display appears to the observer at infinity.

It will be appreciated that the above described embodiment of the invention which relies on a reflecting Cassegrain-type system is by way of an example only. Alternative systems in accordance with the invention may utilise, for example, a laser and first and second light transmissive holographic lens arrangements respectively disposed in the path of rays from the distant scene to the aforesaid third and fourth reflective films 31 and 32.

It will also be appreciated that the cone angle which the image of the screen subtends at the observer's eye may be increased by enlarging the unit. Such enlargement however, eventually results in blindspots in the observer's view of the distant scene, for which reason it is usually unacceptable.

I claim:

1. A head-up display unit having: at least a part so disposed, when in used in a vehicle, as to intercept the line of sight of an observer using the unit to view a scene lying ahead of him; a light deflecting arrangement which enables the observer to see said scene substantially as if said part of the display unit were absent; a source of luminous signals; and optical means for projecting light rays from the source of luminous signals into the light deflecting arrangement so as to be deflected by said light deflecting apparatus thereby to be coincident with, and thence to follow substantially the same optical path through the light deflecting arrangement as rays originating from said scene so to present to the observer using the unit a collimated display of said luminous signal source within his angular field of view of the said scene.

2. A head-up display unit according to claim 1 wherein said optical means for projecting light rays from the source of luminous signals includes one or more partially light reflective surfaces disposed in the paths of, and partially transmissive to light rays from the said scene to said light deflecting arrangement and operative to reflect collimated light rays from the source of luminous signals towards said deflecting arrangement.

3. A head-up display unit according to claim 2 wherein said light deflecting arrangement comprises first and second light reflective planar films disposed in the line of sight of the observer to the aforesaid at least part of the unit and so inclined to one another as to define a space in the form of a prism of triangular cross-section, the apical edge of which is remote from said at least part of the unit, and third and fourth light reflective planar films parallel to and spaced with respect to the said first and second planar films respectively; and in which, the angle of inclination between the first and second planar films is such, and the dimensions of the four planar films and spacings between the first and third and second and fourth films, respectively, are such that certain rays from the distant scene and incident on the third or the fourth planar film are received at at least one eye of the observer after an even number of successive reflections at the first and third or the second and fourth planar films respectively; and wherein said one or more partially light reflective surfaces are disposed in the paths of, and are partially transmissive to light rays from the distant scene to one or other of said third and fourth light reflective planar films and are operative to reflected collimated light rays from the source of luminous signals on to one or other of said third and fourth light reflective planar films.

4. A head-up display unit according to claim 3 wherein said optical means for projecting light rays from the source of luminous signals further includes a convex reflecting surface situated in the path of the light rays from the source of luminous signals, and wherein said one or more partially light reflective surfaces are concave and so disposed as to receive light rays from the source of luminous signals by reflection from said convex reflecting surface.

5. A head-up display unit according to claim 4 wherein an additional source of luminous signals is situated in the said space which is in the form of a prism of triangular cross section formed by the inclination of said first and second light reflective planar films.

6. A head-up display unit according to claim 5 wherein said convex reflecting surface is partially light transmissive and is situated in the path of rays of light from said additional source of luminous signals to the one or more concave reflecting surfaces, and wherein rays of light from said additional source of luminous signals are incident upon said one or more concave reflecting surfaces and are reflected collimated therefrom onto one or other of said third or fourth reflective planar films.

7. A head-up display unit according to claim 5 wherein said first and second light reflective planar films are partially light transmissive and rays of light from said additional source of luminous signals are received by the observer using the unit by means of transmission of said rays through said first and second light reflective planar films.

* * * * *